Oct. 3, 1950     C. W. MOTT     2,524,203
TRACTOR-MOUNTED LOADER
Filed July 29, 1948     2 Sheets-Sheet 1
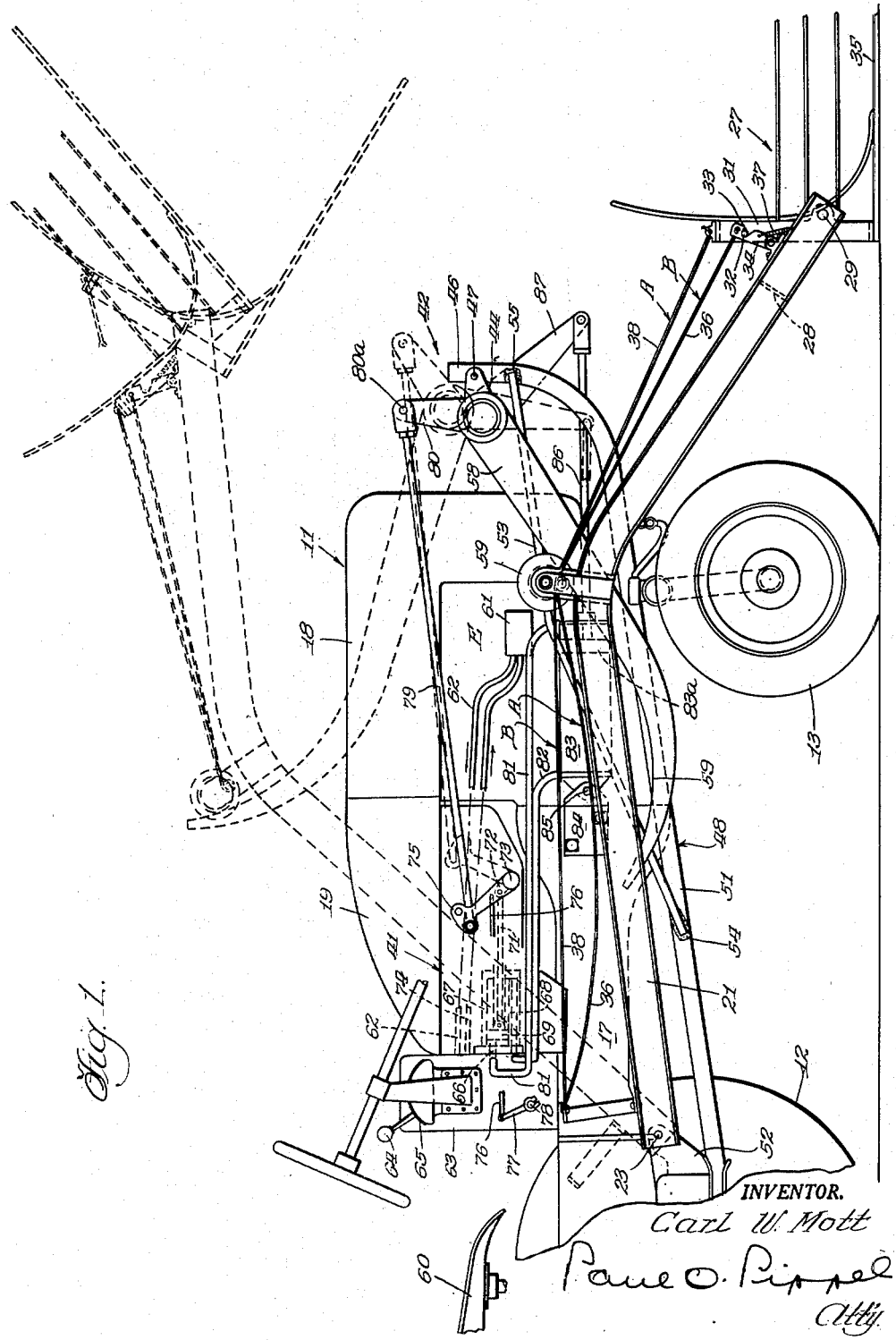
INVENTOR.
Carl W. Mott
Paul O. Pippel
Atty

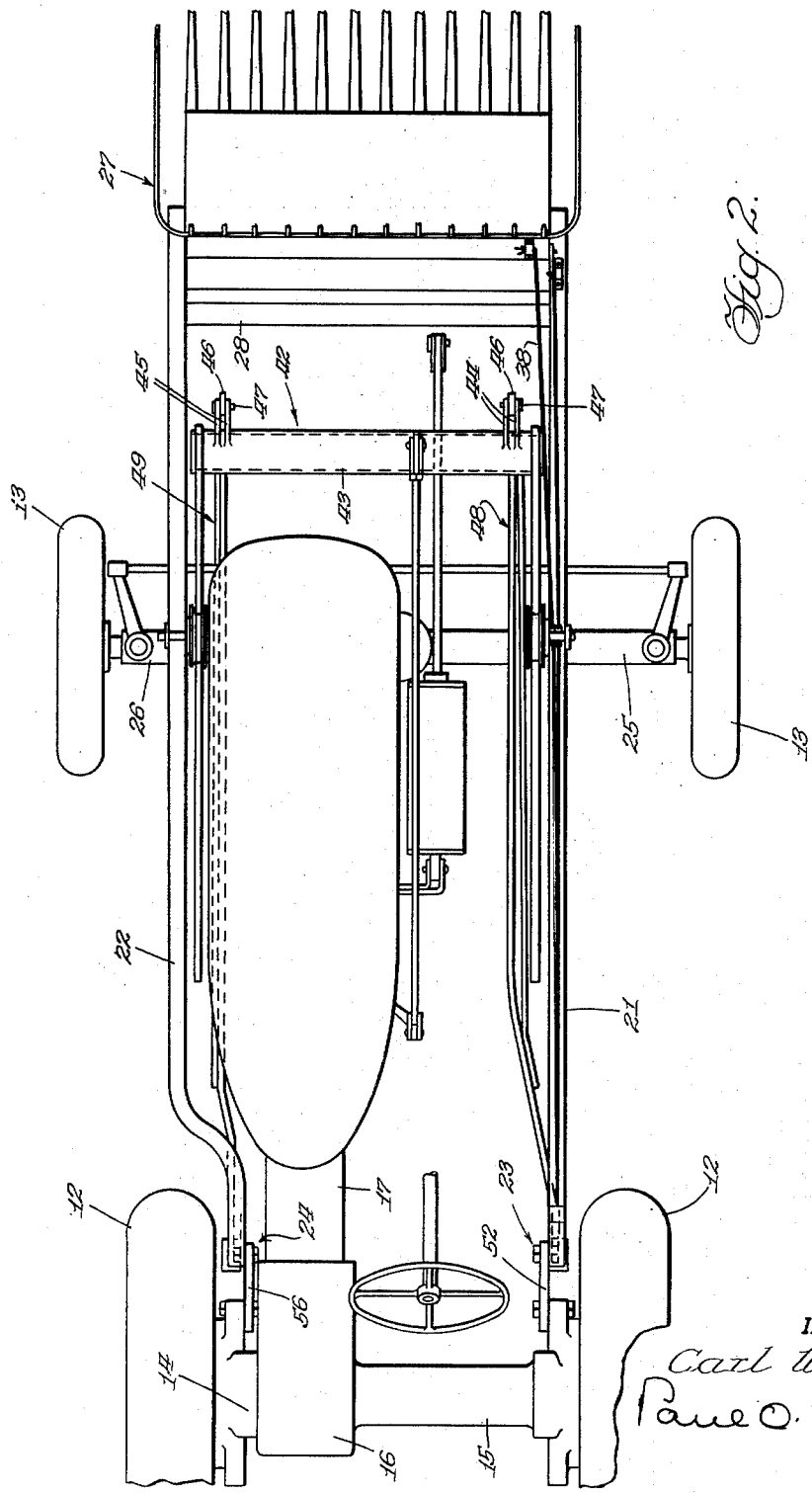

Patented Oct. 3, 1950

2,524,203

UNITED STATES PATENT OFFICE 2,524,203

TRACTOR-MOUNTED LOADER

Carl W. Mott, Lake Ozark, Mo., assignor to International Harvester Company, a corporation of New Jersey Application July 29, 1948, Serial No. 41,341

7 Claims. (Cl. 214—140)

This invention has to do with hydraulically-operated apparatus and concerns particularly an improved type of tractor-mounted loader and a hydraulic system adapted to supply operating force thereto from the tractor engine.

A general object of this invention is the provision of a tractor-mounted loader capable of employing a hydraulic ram with which the tractor is normally equipped, together with a supplemental ram or motor for elevating a load carrier. In the present embodiment this is done by connecting the supplemental ram into the hydraulic circuit of the normally equipped ram and providing complemental mechanical connections of these two rams with the load carrier, wherefore a single control for the normally equipped ram suffices to control both rams. Economy is realized because of using the regularly provided universally used hydraulic equipment for controlling and transmitting power from the tractor engine to the load carrier. Also, the complete hydraulic system retains desirable operating characteristics of the regularly supplied system, namely, that the parts hydraulically operated are caused to move correlatively with the control member both in distance and direction. A connection between the normally provided ram and the control valve causes closing of this valve upon movement of the ram plunger in accordance with an initial movement of the control member and thereby terminates fluid delivery to both rams, although during operation of the normally provided ram, fluid is also supplied to the supplemental ram which acts as a booster and is held in operating phase with the normally provided ram by the operating connections of these two rams with a common power output structure for lifting the load carrier.

The present embodiment illustrates a tractor engine as a power developing unit from which power is transmitted hydraulically to a power output structure which has operating connections with a load carrier of a tractor-mounted loader. It is contemplated, however, that this principle of employing a servo-acting ram in control of a control valve which initiates operation of the ram, together with a supplementary ram utilizable of its force output complementally with the servo ram is equally applicable in other power transmitting systems.

A further object is the provision of a tractor-mounted loader wherein there is a power output structure mounted at an end of the tractor for rocking about a horizontal axis transverse thereto, a load carrier boom pivotally connected with the tractor for vertical movement and projecting beyond such end of the tractor, and cam means constrained for rocking with the power output structure to cooperate with a cam follower on the boom for raising the boom when the power output structure is rocked.

Another object is the provision of a rockable structure according to the preceding objects, wherein there are operating arms projecting respectively upwardly and downwardly therefrom, hydraulic rams mounted on the tractor between its ends, a thrust link operably connected between one of the rams and one of said arms, and a tensile force exerting link connected between the other ram and the other of the arms for complementally rocking the power output structure when the rams are energized.

Another object is the provision of a novel mounting assembly for the power output structure at the end of the tractor, such mounting assembly comprising a pair of elongated frame members extending along opposite sides of the tractor and having upper end portions beyond such end of the tractor for pivotally supporting a rockable element projecting therebetween and supported thereon.

The above and other desirable objects inherent in and encompassed by the invention will be more fully comprehended upon reference to the ensuing description, the appended claims, and the annexed drawings, wherein:

Fig. 1 is a side elevational view of a tractor having a preferred embodiment of the invention assembled thereon.

Fig. 2 is a plan view of the tractor and apparatus mounted thereon in Fig. 1.

The invention is illustrated in Figures 1 and 2 in connection with a power developing unit in the form of a tractor 11. This tractor which is of the four-wheel type has rear traction wheels 12 and front dirigible wheels 13. In Figure 2, rear axle housings 14 and 15 are shown projecting oppositely from a differential housing 16 which is offset to the left, with respect to an operator upon the tractor, of the centerline of the tractor running gear. A body 17 projecting forwardly from the differential housing 16 is also offset to the left from the running gear centerline. The body 17 has an engine E upon a front portion thereof, superposed by a hood 18 from which a fuel tank 19 projects rearwardly.

A loader apparatus for being operated by power transmitted thereto from the tractor engine comprises a pair of booms 21 and 22 pivoted at their rear ends to opposite sides of the tractor body.

The pivot connections of the booms 21 and 22 are designated 23 and 24. Each boom has a forwardly extending straight section rearwardly of the tractor front axles 25 and 26. Immediately above the tractor front axles, the booms bend downwardly and project forwardly for mutually carrying a loader fork 27 on their front ends. The front ends of the booms are rigidly interconnected by a cross piece 28, and pivot connections 29 are provided respectively between the front ends of the booms and opposite ends of the loading fork.

A vertical member 31 attached rigidly to the back of the loading fork has a latch pin 32 which when received in a notch 33 of a pivoted latch member 34 holds the loader fork against pivotal movement clockwise as viewed in Figure 1 whereby its tines 35 are maintained in a horizontal load-carrying position. After the booms have been elevated as explained hereinafter to some such position as that illustrated by dotted lines in Fig. 1, a manually exerted pull on a latch cord 36 by the operator will release the latch 34 from the pin 32 against the force of a spring 37 and permit the loader fork to pivot to the dumping position illustrated by the dotted lines. Reestablishment of the load-carrying position is incurred by the operator pulling upon a cord 38 which causes counter-clockwise movement of the loader fork and replaces the latch pin 32 within the notch 33 where it lodges for being retained within the notch by the spring 37.

Power derived from the tractor for raising the front ends of the booms 21 and 22 and the loader fork 27 is transmitted to the booms through a hydraulic power transmitting unit 41 and a rockable power output structure 42 mounted on the forward end of the tractor for rocking motion about a horizontal axis extending transversely to the tractor. The power output structure 42 includes a tubular elongated member 43 constituting a portion thereof and pairs of apertured ears 44 and 45 projecting radially from the member. These pairs of ears 44 and 45 straddle respective upturned end portions 46 of a mounting assembly for the rockable output structure. The apertures in the ears 44 and 45 align with apertures in the upturned portion 46 and pins 47 inserted in these apertures for pivotally connecting the elongated portion 43 of the power output structure in pendulous fashion to the mounting assembly therefor.

The mounting assembly for the rockable power output structure 42 comprises elongated frames 48 and 49 extending lengthwise of and disposed upon opposite sides of the tractor body. Frame 48, as illustrated in Fig. 1, includes an elongated member 51 attached at its rear end to a bracket 52 on the rear axle housing of the tractor. This member 51 projects forwardly beyond the front axle 25 upon which it rests and includes the upturned front end portion 46. A reinforcing bar 53 extends between the upturned portion 46 and a rearward portion of the bent element 51 and is welded thereto at its two ends respectively at 54 and 55. The side frame 49 is constructed quite similarly to the side frame 48, the back end thereof being connected with the rear axle housing 14 by a bracket 56 and a forward portion of such side frame member resting upon the left front axle 26.

The right end of the rockable power output structure 42 has a long cam arm 58 rigidly connected therewith. The upper edge of this arm 58 constitutes a cam profile cooperable with a flange roller 59 constituting a cam follower mounted upon the boom 22. A portion of the cam arm profile extends downwardly and rearwardly beyond the cam follower 59 while the boom is in its lowermost position and a further portion 59 of such profile continues from the downwardly and rearwardly projecting profile and is curved to extend first horizontally and then upwardly in a rearward direction.

The hydraulic power transmitting unit comprises a pump 61 mounted on a side of the engine and driven from the engine by a power train not shown. Fluid is discharged from the pump through a conduit 62 into a control valve comprising a ported and channelled casing 63. All parts of the hydraulic power transmitting unit 41 including the pump 61 and the control valve 63 may be identical with the corresponding mechanism disclosed in United States Patent No. 2,399,756, issued May 7, 1946, to Carl W. Mott. In view of the details of the hydraulic power transmitting unit being minutely disclosed in said patent, a mere general reference to certain parts of the unit will suffice for the present disclosure. A control member 64 of the valve 63 is swingable fore and aft over a quadrant 65 by manipulation of an operator occupying the tractor seat 60. The valve 63 is operable to determine whether fluid introduced thereto through the conduit 62 is directed into a channel 66 communicating with the rear end of a ram cylinder 67 or whether fluid from the conduit 62 is introduced into a passage 68 leading to the front end of the ram cylinder 67. A ram plunger 69 is connected by a connecting rod 71 with an arm 72 on a rock-shaft 73 mounted transversely of the tractor body. When fluid is introduced into either end of the ram cylinder 67, the valve 63 will cause communication between the opposite end of the cylinder and a conduit 74 leading to the inlet side of the pump 61.

The ram 67—69, in addition to rocking the rock-shaft 73 so that power is available from a rock-shaft arm 75, also serves as a servo motor for controlling shut off of the valve 63. This control of the valve 63 is effected through a link 76 which is connected between the rock-shaft arm 75 and an arm 77 with which a valve controlling shaft 78 is constrained for pivoting. The operation of this hydraulic power transmitting unit is such that when the manually operated member 64 is moved forwardly or rearwardly over the quadrant 65, a corresponding movement will be imparted to the rock-shaft arm 75 by the hydraulic ram 67—69 and the rock-shaft 73 with which the piston rod 71 of said ram is operably connected. After the rock-shaft arm 75 has been moved a distance and direction correlated with the distance and direction of the movement of the member 64, the linkage 76, 77, and 78 will be effective for closing the control valve and causing the rock-shaft arm 75 to be hydraulically locked. During this time that the valve is closed, it will cause establishment of a direct connection between the conduits 62 and 74 whereby the pump 61 can continue operation at relatively low bypass pressure. That part of the hydraulic power transmitting unit thus far described is commercially produced, wherefore the hydraulic ram 67—69 may be regarded as a normally provided ram. This ram is operable through the rock-shaft arm 75 operated thereby and a thrust link 79 to urge the power output structure 42 to rotate clockwise as viewed in Fig. 1. An upwardly projecting arm 80 of the power output structure is pivotally connected at 80ª with the front end of the thrust link 79. According to this invention, however, the hydraulic system of the hydraulic power transmitting unit is tapped into at conduits 66 and 68 by conduits 81 and 82 which lead to a supplemental ram or motor 83. The back end of the cylinder of the ram 83 is pivotally connected to the tractor body by means of a bracket 84 and a pivot pin 85. The piston 83ª of the ram 83 is connected by a tension link 86 with the lower end of an arm 87 projecting downwardly from the power output structure. By tracing the conduits in Fig. 1, it can be ascertained that when fluid under pressure is introduced into the conduit 66 and hence into the rear end of the ram cylinder 67 for urging the ram piston 69 forwardly and thereby urging the rock-shaft arm 75 to rock clockwise, fluid will be concurrently introduced into the conduit 81 and thence into the front end of the ram 83 for forcing the plunger 83ª rearwardly and creating a tensile force in the link 86 concurrently with the thrust force exerted through the link 79 by the rock-shaft arm 75, and these two end forces in the links 79 and 86 operate complementally for rocking the power output structure 42 clockwise.

Forward manipulation of the control member 64 causes introduction of fluid under pressure into the passage 66 for energizing the two rams 67—69 and 83 in a manner just described for rocking the power output structure clockwise. This causes the cam arm 58 to raise the cam follower 59 and to cause upward swinging of the motor booms 21 and 22 while the cam follower rolls rearwardly upon the cam profile. The operator will predetermine the elevation at which the loader fork 27 is raised in accordance with the distance he manually advances the control member 64 forwardly along the quadrant 65. When the loader fork reaches its predetermined elevation the servo-motor 67—69 will have operated the linkage 76, 77, and 78 for closing the valve and terminating further delivery of fluid into the rams. It is immaterial that only the ram 67—69 is connected with the control valve 63 for shutting it off by servo action. The bore and stroke of the supplemental ram 83 is not critical because these two rams are connected in fixed phased relation by their operating connections of the links 79 and 86 with the rockable power output structure. So long as the plunger 69 of the ram 67—69 continues to move in the attainment of a position predetermined by manual setting of the control member 64, fluid will be introduced into the rear end of the ram cylinder 67 and into the front end of the ram 83, and fluid entering the ram 83 will supplement the force of the ram 67—69 in rocking the power output structure 42. Diverting of fluid from the ram 67—69 into the ram 83 under these conditions would, of course, diminish the speed with which the ram plunger 69 would otherwise move (assuming the pressure to be sufficient to enable this ram to overcome the resistance imposed upon the rockable structure by a loaded boom structure) but ultimately sufficient fluid will be introduced into the two rams to cause movement of the ram plunger 69 into the position for causing shut off of the valve 63. Use of the supplemental valve ram 83 diminishes the required necessary unit pressure of fluid in the system for overcoming any given resistance to rocking of the power output structure. Thus the ram 83 acts as a booster for aiding the ram 67—69 and the hydraulic system employed for the two rams is such that the operating characteristic whereby the movements of the ram plunger 69 are correlated in direction and distance with the movements of the control member 64 is preserved.

The foregoing explanation of the introduction of fluid in the two rams has presupposed the condition of the control member 64 being moved forwardly for causing raising of the loader fork. However, the same conditions prevail when the control member is moved rearwardly in the respect that the two rams are tied together through the power output structure for maintaining their in-phase relation and in the respect of the position of the ram plunger 69 and the position of elevation of the loader fork remaining correlated with the position of the control member 64 upon its quadrant.

In Fig. 1 it will be noted that the cam arm 58 imposes force upon the cam follower 59 by means of a relatively short force arm when initially raising the loader fork 27 to break its load loose from a pile of material from which the load is being removed. The relatively short force arm continues to be utilized by the cam arm 58 until the load is broken loose and there has been a substantial acceleration in the speed of movement of the ascending load. Thereafter the force necessary for continuing upward movement of the load diminishes, wherefore the profile of the cam arm is so designed that the effective force arm acting upon the cam follower 59 increases to cause a direct increase in the speed at which the load is raised. The operating speed of the apparatus is effectively increased by so designing a cam arm that upward movement of the loader fork is at an increased speed after the load has been broken loose and is susceptible of being elevated at a rapid rate.

Having thus described the single preferred embodiment of the invention with the view of clearly defining and illustrating the same, I claim:

1. In combination, a power developing unit in the form of a tractor which comprises transversely extending rear axle housings, a body extending forwardly from such housings and an engine upon a forward part of such body; an hydraulic power transmitting unit comprising a pump driven from said engine, an hydraulic motor mounted on said body rearwardly of the engine and including a work member movable when subjected to fluid under pressure delivered by the pump, conduit means communicative between the pump and motor, and control valve means interposed in the conduit means, said control valve means being manually settable to subject the motor to such fluid via the conduit means and resettable by ensuing movement of the motor work member for terminating subjection of the motor to such fluid incident to movement of the work member an amount determined by the manual setting of such valve means; a rock-shaft mounted on the tractor body rearwardly of the engine; means connecting the rock-shaft with said work member so it will be rocked thereby when the work member is moved; a power output structure; means mounting said structure forwardly of the tractor engine and for rocking movement about a horizontal axis extending transversely of the tractor body; means connecting the rock-shaft with the output structure for rocking the same pursuant to movement of the motor work member; a scoop loader boom structure pivotally connected with the rear axle housings and projecting forwardly beyond the rockable power output structure; means operated by rocking motion of the output structure for raising the forward part of the boom structure; a supplemental hydraulic motor mounted on a side of the tractor body and having a work member movable when subjected to fluid under pressure delivered by the pump; means connecting the supplemental motor work member with the rockable power output structure for movement thereof complementally with the action of the first hydraulic motor; and conduits connecting the supplemental motor with said conduit means to cause subjection of such supplemental motor to fluid pressure coterminously with the subjection of the first motor to such fluid pressure.

2. In combination, a tractor having a fore and aft extending body, a loader boom pivoted on a rear portion of the tractor and projecting forwardly beyond said body, a rockable structure mounted on the tractor forwardly of said body for rocking motion about a horizontal axis extending transversely of the body, a cam follower on the boom rearwardly of the rockable structure and disposed below the pivot axis of the rockable structure, a cam arm constrained for rocking motion with said structure and projecting rearwardly therefrom beneath the cam follower, said cam arm having a profile cooperating with the follower and of which a portion projects downwardly and rearwardly from the follower while the latter is in a lowered position, said profile portion being operable to raise such follower and the forward portion of the boom pursuant to rocking of the rockable structure in the direction raising the cam arm, and means on the tractor for rocking said structure.

3. The combination set forth in claim 2, wherein a further portion of the cam profile continues from the downwardly and rearwardly projecting cam profile portion and is curved to extend first horizontally and then upwardly in a rearward direction.

4. In combination, a tractor comprising a fore and aft extending body; an auxiliary power transmission system of an hydraulic type installed upon the tractor and comprising an hydraulic ram including a plunger, an hydraulic circuit for controlling the pressure of fluid upon the ram to determine direction and amount of movement of the ram plunger, and a manually operated control including valve means in the hydraulic circuit and a control member manipulatable of the valve means to initiate movement of the ram plunger in a direction correlated with the direction the control member is manipulated, and means connecting the ram plunger with the valve means to control the same for interrupting such initiated movement of the ram plunger after movement thereof an amount correlated with the amount of control member manipulation; a rockable structure mounted on the tractor forwardly of said body and rockable about a horizontal axis extending transversely of such body; a loader boom pivoted on a rear part of the tractor and projecting forwardly of the body; a cam follower on the boom rearwardly of the rockable structure; a cam arm constrained for rocking motion with the rockable structure and projecting radially therefrom into cooperative relation with the cam follower for elevating the follower and the forward end of the boom pursuant to rocking of the structure; a supplemental hydraulic ram mounted on the tractor rearwardly of the rockable structure; conduit means communicating between the supplemental ram and said hydraulic circuit for causing application of fluid pressure upon the supplemental ram for moving its plunger concurrently with movement of the first ram plunger and in a correlated direction of movement; and operating links connected respectively with the ram plungers and with the rockable structure for complementally rocking the structure in an amount and direction correlated with the amount and direction of manual setting of the control member.

5. The combination set forth in claim 4, wherein there are operating arms projecting respectively upwardly and downwardly from the rockable structure, wherein there is a rock-shaft mounted transversely of and upon the tractor body above the supplemental ram and rockable by the first ram, a rock-shaft arm constrained for rotation with said rock-shaft and projecting upwardly therefrom, a thrust link connected between the upper end of said rock-shaft arm and the upwardly projecting arm on the rockable structure, and a tension link connected between the supplemental ram plunger and the downwardly projecting arm of the rockable structure.

6. In a power output structure for use upon a tractor having a fore and aft extending body and axles projecting laterally outwardly from the body adjacently to an end thereof, a mounting assembly comprising a pair of elongated frame members disposable lengthwise of the tractor on opposite sides thereof for attachment thereto, said frame members having upturned end portions and being of a length to project such end portions beyond an end of the tractor body while other portions of said members are supported respectively on said axles, and a rockable structure extending transversely of the tractor and pivotally connected with said upturned end portions of the frame members, and means on the rockable structure for imparting rocking motion thereto.

7. In a power output structure for use upon a tractor having a fore and aft extending body, a mounting assembly comprising a pair of elongated frame members disposable lengthwise of the tractor on opposite sides thereof for attachment thereto, said frame members having rockable structure supporting end portions and being of a length to project such end portions beyond an end of the tractor body, and a rockable structure extending between said frame end portions for pivotal support thereby, said rockable structure having an elongated portion extending between the end portions of the frame members and parts projecting transversely from such elongated portion into respective pivotal connection with the frame end portions to cause the elongated portion to swing pendulously pursuant to rocking thereof.

CARL W. MOTT.

REFERENCES CITED

The following references are of record in the file of this patent:

UNITED STATES PATENTS

| Number | Name | Date |
| --- | --- | --- |
| 1,292,029 | Paine | Jan. 21, 1919 |
| 2,173,158 | Corbett | Sept. 19, 1939 |
| 2,398,119 | Sauder | Apr. 9, 1946 |
| 2,433,086 | Borgelt | Dec. 23, 1947 |
| 2,465,476 | Pokorny et al. | Mar. 29, 1949 |
| 2,469,615 | Templeton | May 10, 1949 |

FOREIGN PATENTS

| Number | Country | Date |
| --- | --- | --- |
| 416,019 | Great Britain | Sept. 4, 1934 |